July 23, 1963
J. H. BLOMSTRAND
3,098,283
SELF-CENTERING TOOL HOLDER
Filed Aug. 8, 1960
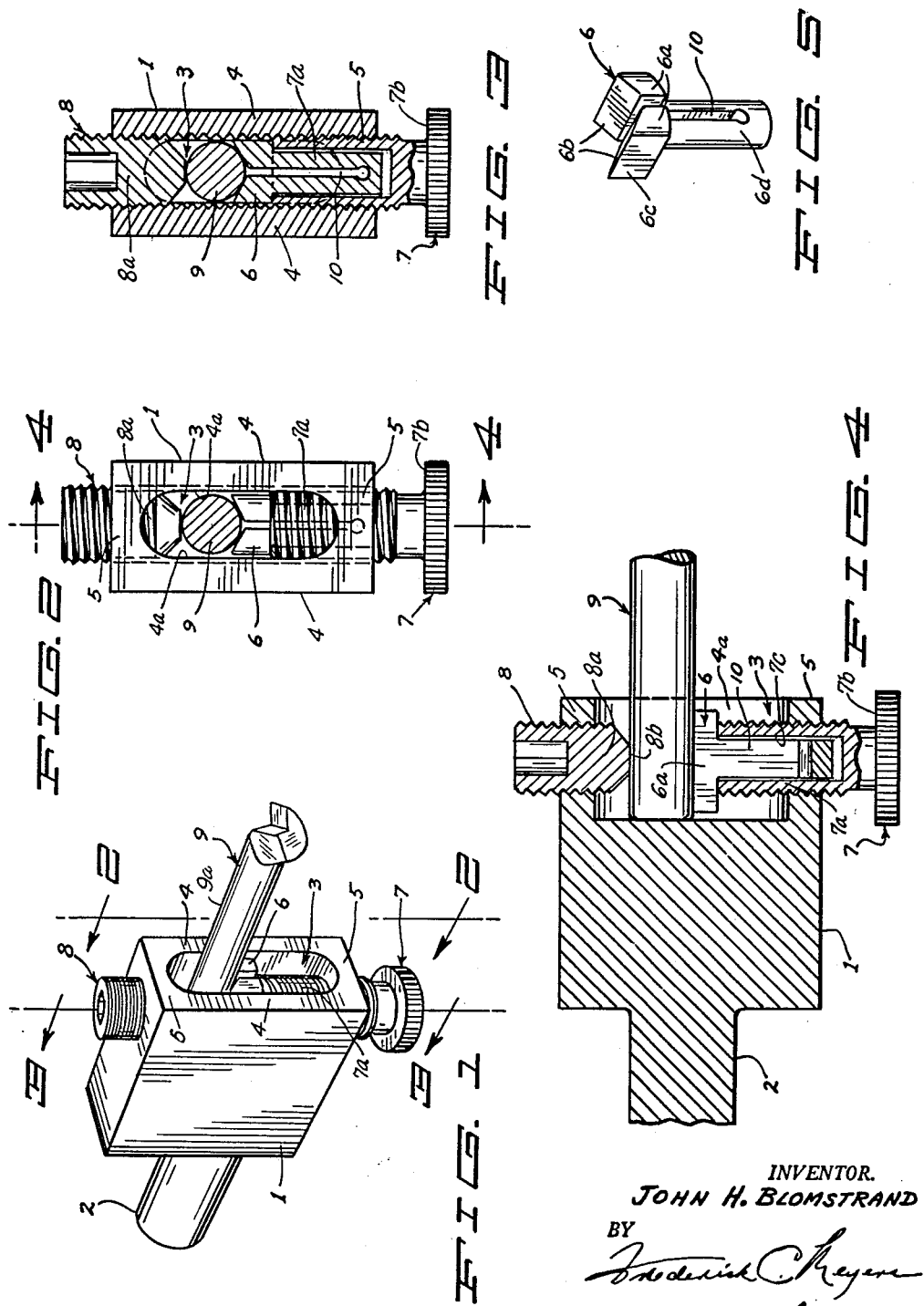
INVENTOR.
JOHN H. BLOMSTRAND
BY
Frederick C. Meyers
ATTORNEY — # United States Patent Office 3,098,283
Patented July 23, 1963

---

3,098,283
SELF-CENTERING TOOL HOLDER
John H. Blomstrand, Minneapolis, Minn., assignor of one-half to Frederick W. Nyquist, St. Paul, Minn.
Filed Aug. 8, 1960, Ser. No. 48,009
2 Claims. (Cl. 29—96)

This invention relates to a self-centering tool holder and more particularly to an improved tool holding device which will hold shanked tools in rigidly aligned position.

In tool holding devices wherein positioning of the tool element is required to be precise, it is generally necessary to utilize a tool holding means of precision construction. It is many times also essential that the shanked portion of the tool member be of precision manufacture if the tool member is to be properly positioned within and held by the tool holding assembly.

It is therefore an object of this invention to provide a tool holding device of improved construction which provides accuracy of alignment and positioning without at the same time requiring precision machining of the entire device.

Another object of this invention is to provide a tool holder having a self-centering feature in respect to that portion which engages the tool member.

Still another object of this invention is to provide a tool holding assembly which is adaptable to relatively large lateral positioning of the retained tool member.

A still further object of this invention is to provide a tool holding device capable of retaining a tool in aligned position without regard to whether the shanked portion of the tool may be slightly tapered or out of round.

Another object of this invention is to provide tool holding means adaptable to receive and retain in aligned position tool elements having variably sized shanks.

Still a further object of this invention is to provide tool holding means of simple and economical construction and yet easily adaptable to the rigid and positive securement of shanked tool elements.

I have illustrated an embodiment of my tool holding invention in the accompanying drawings wherein like reference numerals are used to illustrate like elements and wherein:

FIGURE 1 is a perspective view of a tool holder embodying my invention.

FIGURE 2 is a front elevation taken along line 2—2 of FIGURE 1.

FIGURE 3 is a cross-section taken along line 3—3 of FIGURE 1.

FIGURE 4 is a section in side elevation taken along line 4—4 of FIGURE 2.

FIGURE 5 is an enlarged perspective illustrating one form of the wedge means of my tool holding invention.

In FIGURE 1, body 1 terminates at one end in a mounting member such as shank 2 and at the opposite end in slotted opening 3. Threadably and advanceably carried in body 1 are a pair of abutting means 7 and 8 which are advanced toward each other and co-operate with a wedge means 6 to alignedly secure tool shank 9a of 209 within slotted opening 3. Slotted opening 3 is generally defined by and bounded by a pair of confronting end walls 5 and a pair of confronting side walls 4.

In FIGURE 2, which is a front elevation taken along line 2—2 of FIGURE 1, the body 1 is again shown terminating at one end in a slotted opening 3 which, more specifically now, is partially defined by a pair of substantially parallel and confronting sidewall surfaces 4a of side walls 4. Advanceable abutting means 7 and 8 are shown having a threaded hollow sleeve portion 7a and a threaded portion 8a respectively which are threadably carried within end walls 5 and terminate within slotted opening 3 in generally opposed and axially aligned relation. Abutting means 7 is provided with a knurled portion 7b which may be grasped and manually turned whereby to provide axial advancement and retraction into and out of opening 3. Likewise, abutting means 8 is provided with a means such as opening 8b which will receive a wrench, thus allowing positive driving means whereby to force the tool 9 into clamped engagement with wedge means 6 once abutting means 7 is laterally positioned. Wedge means 6 is slidably and rotatably carried within the hollow sleeve portion of abutting means 7. The hollow sleeve is defined by an inside circular wall 7c.

In FIGURE 3, a cross-section is shown taken along line 3—3 of FIGURE 1. The slotted opening 3 of body 1 is again shown bounded by side walls 4 and end walls 5. Threadably carried by the end walls 5 are abutting means 7 and 8 shown advanced toward each other and into a holding position for fixedly securing tool 9.

Referring now to FIGURES 3 and 5, the wedge means 6, having a pair of resiliently separable V-blocks 6a and an integrally formed bifurcated rod 6d, is more clearly shown as it is positioned with respect to sidewall surfaces 4a and between tool 9 and abutting means 7. As seen in FIGURE 3, the separable V-blocks have an outer surface 6c which are in slidable relation with sidewall surface 4a whereby to maintain wedge means 6 in an alignment position regardless of where the tool 9 is vertically positioned in opening 3.

The slot 10 of wedge means 6, as shown, is of substantial length whereby to allow the resilient separation of the V-blocks. V-blocks 6a are also provided with confrontingly positioned angulated surfaces 6b which cooperate to form elongate bearing surfaces upon which the tool 9 rests. The characteristic of the V-blocks allows a quick and positive self-centering of the tool on a plane parallel with the sidewalls 4 when clamped.

In FIGURE 4, a section in side elevation taken along line 4—4 of FIGURE 2, body 1 terminates at one end in the shank 2, which, as shown, has an axis substantially perpendicular to that of abutting means 7 and 8, and at the other end in slotted opening 3. Wedge means 6 is again shown contained within slotted opening 3 by the bifurcated rod member 6d which is in turn carried within the hollow sleeve portion of advanceable abutting means 7. As seen in this view, there is sufficient clearance between rod 6d and circular wall 7c such that frictional binding between the rod and wall will be avoided when the tool 9 is forced against the angulated surfaces 6b and slot 10 are caused to separate. As also seen, tool carrying shank 9 is rigidly held against the terminal end 8b of abutting means 8 by wedge means 6.

Referring to FIGURE 4 it is quite apparent that the tool shank 9a contacts each of the V-blocks in a line contact for the length of each block. With a substantially smaller area of contact provided by terminal end 8b, a fulcrum action is developed wherein the tool 9 will pivot about end 8b until the tool is firmly seated with equal pressures along its line contact with the V-blocks. It will thus be readily understood that various sized tools may each be equally as well accommodated by this tool holder as well as tools whose shanks are bent or out-of-round as a result of usage in other tool holders.

In practicing my invention, it is not necessary to utilize the specific body means illustrated in the accompanying drawings and described in the foregoing specification. Any suitable body means which will carry opposing abutting means and a co-operating wedge means adapted to receive and retain a tool shank in aligned position may be utilized.

Moreover, it is not essential that the slotted opening within the body means be precisely machined because alignment of the tool member is principally achieved by the co-operative action of the abutting and wedging means without regard to the precise dimensions of either the body means or the slotted opening therein. The V-blocks also aid in aligning the tool by their dual wedging action, as mentioned above, wherein the outer surfaces 6c are wedged into intimate contact with the side wall surfaces 4a while at the same time the V-blocks are wedging against tool 9.

The slotted opening may be so dimensioned as to either permit a substantial lateral positioning of the tool any place along the slot or it may be so reduced in size as to permit tool positioning within only a confined area. In either event, the holding action exerted on the tool by the abutting means and wedge means will be the same. If a slotted opening is provided as shown in FIGURES 1 through 5 then several tools having various sized shanks may be easily accommodated between the two confronting end walls.

Any suitable abutting means which may be carried by the body means employed may also be utilized in practicing my invention. The abutting means must, of course, be carried by the body means in generally opposed relation, but it is unimportant whether they comprise a threaded device as illustrated in the drawings and described in the foregoing specification or whether they take another form.

While I have illustrated abutting means wherein both are advanceably carried within the body means, the practice of my invention only requires that one of said abutting means be advanceably carried therein.

Moreover, while I have described an embodiment of my invention utilizing wedge means generally comprising a pair of wedging blocks carried by a bifurcated rod, my invention may be carried out with any other suitable wedge means. For example, it is possible to confine the wedge means within the slotted opening and in drivable relation with an advanceable abutting means by providing guiding and retaining surfaces for the wedge means along the interior side wall surfaces of the slotted opening.

Furthermore, it is not essential that the wedge means be carried on a bifurcated member since it may comprise either separate elements or a single spreadable element, as for example, a pair of wedges or a bifurcated V-block slidably contained within the slotted opening of the body member positioned in drivable relation to an advanceable abutting means and adapted to wedgeably engage a tool carrying shank element in co-operation with the other abutting means.

What I claim is:

1. A tool holder comprising, a body terminating in a mounting member at one end and a slotted opening at the other end, said slotted opening being bounded by a pair of confronting side walls and a pair of confronting end walls, an abutting means threadably advanceable through one of said pair of confronting end walls and terminating within said slotted opening, a bifurcated V-block wedge means positioned in said slotted opening and adapted to have a tool held between it and said abutting means, means for advancing said bifurcated V-block wedge means toward, and for retracting away from, said abutting means along an axis parallel to that of said abutting means, said bifurcated V-block wedge means having sides positioned in slidable relation with said confronting side walls, such that when a tool is positioned between said bifurcated V-block wedging means and said abutting means, and said abutting means is advanced into pressing engagement with said tool, said bifurcated V-block wedge means will spread outwardly and frictionally bear against said side walls.

2. A tool holder comprising, a body terminating in a mounting member at one end and a slotted opening at the other end, said slotted opening having a pair of confronting side walls and a pair of confronting end walls, a first abutting means threadably advanceable through one of said pair of confronting end walls and terminating within said slotted opening, a second abutting means threadably advanceable through the other of said pair of confronting end walls and in substantial alignment with said first abutting means, said second abutting means having a hollow sleeve portion also terminating within said slotted opening, separable V-blocks having cooperating elongate bearing surfaces adapted to self-center a tool in a plane parallel to said side walls, said V-blocks having a pair of sides positioned in slidable relation with said confronting side walls whereby to align said V-blocks in parallel relation to said side walls, mounting means slidably engaged in said hollow sleeve portion of said second abutting means, said mounting means comprising a bifurcated rod having a slot for a substantial portion of its length, the bifurcated end integrally terminating respectively in, and rendering resiliently separable, said V-blocks, said first abutting means also having a terminal end within said slotted opening adapted to contact said tool in a substantially smaller area than that in contact with said V-blocks, whereby a tool may be fixedly clamped between said V-blocks and said first abutting means in any vertical position between said confronting end walls.

References Cited in the file of this patent

UNITED STATES PATENTS

| | | |
|---|---|---|
| 85,329 | Reid | Dec. 29, 1886 |
| 751,701 | Tiffany | Feb. 9, 1904 |
| 807,166 | Grant | Dec. 12, 1905 |
| 908,804 | Rhoades | Jan. 5, 1909 |
| 1,028,805 | Wood | June 4, 1912 |
| 1,379,866 | Hollingsworth | May 31, 1921 |
| 2,333,228 | Barrett | Nov. 2, 1943 |
| 2,362,053 | Danielson | Nov. 7, 1944 |
| 2,425,409 | Wilson | Aug. 12, 1947 |
| 2,439,635 | Ruch | Apr. 13, 1948 |
| 2,654,601 | De Vlieg | Oct. 6, 1953 |
| 2,720,392 | Cartlidge | Oct. 11, 1955 |
| 2,913,935 | Flannery | Nov. 24, 1959 |